United States Patent Office 2,853,503

Patented Sept. 23, 1958

2,853,503

POLYSILOXANE COMPOUND

Donald L. Bailey, Snyder, and Francis M. O'Connor, Kenmore, N. Y., assignors to Union Carbide Corporation, a corporation of New York No Drawing. Application October 31, 1955
Serial No. 544,032

2 Claims. (Cl. 260—448.2)

This invention relates to a novel polymerizable polysiloxane compound containing silicon-bonded hydrocarbon constituents, including methyl, ethyl and vinyl radicals in the form of a relatively short-chain, well defined, low molecular weight linear polysiloxane. More particularly, the invention contemplates the provision of a polymerizable linear trisiloxane containing an ethylvinyl-bonded silicon atom and two trimethyl-bonded silicon atoms in the form, 3-ethyl-1,1,1,5,5,5-hexamethyl-3-vinyltrisiloxane [bis(trimethylsiloxy)vinylethylsilane], the linear trimer represented by the formula:

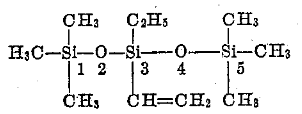

and which may be represented, also, by the formulae:

$$(CH_3)_3SiO[(C_2H_5)(CH_2{=}CH)SiO]Si(CH_3)_3, \text{ or}$$
$$(ViEtSi)(OSiMe_3)_2$$

wherein Me, Et and Vi represent the methyl, ethyl and vinyl groups, respectively.

The various hydrocarbon substituted polysiloxanes heretofore known in industry are essentially of two general types, (1) those containing all saturated hydrocarbon substitutes, and in which crosslinking required for the formation of higher molecular weight resinous materials is effected through the $(Si{-}O{-}Si)_n$ linkages, and, (2) those containing siloxane units with saturated hydrocarbon substituents as well as siloxane units with unsaturated hydrocarbon substituents, or siloxane units having mixed saturated hydrocarbon substituents and terminally unsaturated substituents, such as the vinyl radical, through which they may be polymerized in the formation of higher molecular weight compounds. For the most part, known polysiloxanes of the second classification above, are either cyclic in nature, or poorly defined, high molecular weight polymers in which the positioning of unsaturated groups is unknown or at best uncertain. Furthermore, the known linear polysiloxanes of the same general classification are either (1) relatively high molecular weight compounds containing the repeating Si—O—Si group substituted with relatively small percentages of unsaturated substituents, considering the overall chain-length and hydrocarbon-to-silicon ratio of the polymeric molecules, or, (2) relatively high molecular weight compounds containing the repeating Si—O—Si group substituted with relatively high percentages of unsaturated substituents. The latter class of compounds are multifunctional with respect to unsaturated groups such that when polymerized through these groups, extensive crosslinking occurs. The compound of the present invention, on the other hand, is a well defined, pure compound of known structure, and is monofunctional with respect to the unsaturated or vinyl substituent group. Accordingly, the compound may be employed as a monomeric constituent and its polymers, prepared through vinyl addition, are soluble, linear compounds rather than insoluble, crosslinked copolymers of the type obtained through polymerization reactions conducted with known compounds of the general class described.

Apart from the capacity of vinyl-substituted polysiloxanes to undergo organic polymerization, these compounds are of particular interest because of the fact that the reactivity of a silicon bonded vinyl group permits the application of specialized curing techniques, other than conventional siloxane condensation procedures to polymers containing unsaturated groups of this type, such, for example, as in the production of silicone rubbers. While silicon bonded vinyl groups can be incorporated into high molecular weight siloxanes by conventional cohydrolysis procedures, for certain applications these techniques are not entirely satisfactory. Thus, the incorporation and uniform distribution of very small amounts of silicon-bonded vinyl groups within a polymer would be difficult to control in a cohydrolysis. Furthermore, in lieu of crude cohydrolyzates, a particular process or reaction may require an individual well defined, low molecular weight pure siloxane as a starting material either for reasons of economy or because of the desired mechanism of reaction sought, and the novel trisiloxane of the present invention is ideally suited for this purpose. For example, our compound is useful as a vinyl-containing siloxane which can be equilibrated with dimethyl siloxanes to yield vinyl modified silicone polymers for silicone elastomers, or, for modification of siloxane polymers in general. Alternatively, the compound may be used in the preparation of copolymers with organic olefinic monomers such as styrene, vinyl chloride, etc. Following copolymerization with organic olefines, the compound of the invention can be equilibrated with additional silicone in a controlled manner to yield, for example, "block coplymers." Such a procedure would be impossible with similar products presently known to industry.

The compound of the invention is essentially monomeric in nature and functions as a monomer constituent of polymer chains comprising oils or fluids, gums and other intermediates suitable for use in carrying out further polymerization reactions.

Preparation of the novel hydrocarbon-substituted trisiloxane of the invention may be effected by reaction of ethylvinyldichlorosilane, ($EtViSiCl_2$), with potassium trimethyl silanolate in an organic solvent system, or, by cohydrolysis of ethylvinyldichlorosilane with trimethylchlorosilane. Alternatively, the compound may be obtained by reaction of bis (trimethylsiloxy) ethyl silane [$EtHSi(OSiMe_3)_2$] with acetylene.

The invention may be best understood by reference to the following specific examples of a typical preparation and recovery of the compound of our invention, and utilization of the compound in the preparation of useful copolymers:

EXAMPLE I

*Preparation of 3-ethyl-1,1,1,5,5,5-hexamethyl - 3 - vinyltrisiloxane*

Into a one (1) liter flask equipped with a reflux condenser, and moisture trap were placed 324 grams (2.0 moles) of hexyamethyldisiloxane, 130 grams (2.0 moles) of potassium hydroxide, 170 cc. of butyl alcohol, and 100 cc. of toluene. The mixture was heated at the reflux temperature for 48 hours during which period 31.0 cc. (1.72 moles) of water were collected in the moisture trap.

The flask containing the solution of crude potassium trimethyl silanolate prepared by the foregoing procedure was equipped with a reflux condenser, mechanical stirrer, and a dropping funnel. Vinylethyldichlorosilane, in amount 156 grams (1.0 mole), was added with cooling via the dropping funnel. When all of the dichlorosilane had been added, the mixture was stirred for several hours, filtered, and the solid material washed with toluene. The filtered material was then distilled under reduced pressure and there was obtained 113.7 grams of 3-ethyl-1,1,1,5,5,5-hexamethyl-3-vinyltrisiloxane at a conversion of 43 mole-percent. The compound has a boiling point of 74.76° C. at 15 mm. Hg and a density of 0.835 gr./cc. (25° C.).

EXAMPLE II

*Preparation of copolymer of 3-ethyl-1,1,1,5,5,5-hexamethyl-3-vinyltrisiloxane with vinyl chloride*

Employing an emulsion recipe of the composition,

| | G. |
|---|---|
| Total monomers | 50.0 |
| Water | 90.0 |
| SF flakes | 1.0 |
| $K_2S_2O_8$ | 0.5 |

polymerization of two separate batches (I and II) was effected in sealed glass containers placed in a shaker in a constant temperature water bath. Details of monomer loading, conversion, polymerization time, and temperature for the respective batches are shown in Table I, below. The copolymers were precipitated with methanol and extracted in a Soxhlet extractor for approximately forty-eight (48) hours with a 70/30/10 mixture of ethanol, toluene, and water. This mixture was found to be highly efficacious in removing soap and catalyst from the copolymers. Extraction was continued in each case until no further material could be extracted. The purified copolymers were then dried in a vacuum-oven for twenty-four hours (24) at 60° C. Chlorine analyses were obtained on the copolymers and these results are also shown in Table I, below. From the composition of the copolymers, it was possible to calculate the reactivity ratios as, $r_I=0.14$ and $r_{II}=11.0$.

TABLE I

[½ hour at 50° C.]

| Copolymer | Loading, g. ViCl | Loading, g. Siloxane | Monomer Mole Fraction Siloxane ($M_2$) | Yield (g.) | Percent Conversion | Percent Cl | Mole Fraction in Copolymer ($M_2$) |
|---|---|---|---|---|---|---|---|
| I | 34.60 | 16.00 | 0.10 | 0.2 | 0.4 | 1.04 | 0.93 |
| II | 46.21 | 4.32 | 0.021 | 0.8 | 1.6 | 31.46<br>34.13 | 0.148 (average) |

Films were pressed quite easily from sample II. Good films were obtained which were transparent and flexible. Possible applications for the copolymers might be found in those fields where low-viscosity polyvinylchloride is used at present, or in the production of flexible films containing no plasticizer.

In general, we have found that the ethyl vinyl trisiloxane of the invention is more compatible with most organic materials than are the methyl vinyl siloxanes. The ethyl vinyl compound is also less volatile than methylvinyl substituted polymers, and thus there is less danger of loss of the critically small percentages used when copolymerizing our compound with other siloxanes at elevated temperatures.

Since it is considered obvious that some changes and modifications can be made in the foregoing methods and procedures without departing from the nature and spirit of our invention, it is to be understood that the invention is not to be limited to the specific details offered by way of illustration above, except as set forth in the following claims.

We claim:

1. A chemical compound in the form of a linear siloxane polymer consisting of one ethyl vinyl siloxane unit and two trimethyl siloxane units.

2. The chemical compound, 3-ethyl-1,1,1,5,5,5-hexamethyl-3-vinyltrisiloxane, represented by the formula:

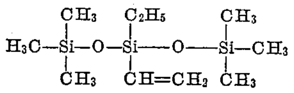

References Cited in the file of this patent

UNITED STATES PATENTS

| | | |
|---|---|---|
| 2,457,677 | Hyde | Dec. 28, 1948 |
| 2,645,628 | Hurd | July 14, 1953 |
| 2,756,246 | Burkhard | July 24, 1956 |